US005656341A

United States Patent [19]

Pantaleo

[11] Patent Number: 5,656,341

[45] Date of Patent: Aug. 12, 1997

[54] LIQUID-FILLED,TWO-CHAMBER DEVICE PERMITTING TRANSFER OF LIQUID AND DISCRETE ARTICLES BETWEEN THOSE CHAMBERS

[76] Inventor: Terese A. Pantaleo, 2004 Black Swan Ct., Darien, Ill. 60561

[21] Appl. No.: 634,040

[22] Filed: Apr. 17, 1996

[51] Int. Cl.[6] ..................... B32B 3/20

[52] U.S. Cl. ..................... 428/13; 428/166; 428/321.5

[58] Field of Search ..................... 428/7, 13, 166, 428/321.5

[56] References Cited

U.S. PATENT DOCUMENTS

| | | | |
|---|---|---|---|
| 3,898,781 | 8/1975 | Facchini | 428/13 X |
| 3,983,277 | 9/1976 | Ackerman et al. | 428/13 X |
| 4,057,921 | 11/1977 | Ball | 428/13 X |
| 4,359,224 | 11/1982 | Nottingham et al. | 428/166 X |
| 4,362,299 | 12/1982 | Suzuki | 428/13 X |
| 4,390,575 | 6/1983 | Kopp | 428/188 X |
| 4,528,224 | 7/1985 | Ausnit | 428/99 X |
| 4,561,109 | 12/1985 | Herrington | 428/99 X |
| 4,631,210 | 12/1986 | McGee et al. | 428/13 |
| 4,686,784 | 8/1987 | Smithies | 428/13 X |
| 4,736,853 | 4/1988 | O'Mara | 428/100 X |
| 4,738,888 | 4/1988 | Pantaleo et al. | 428/13 |
| 5,047,267 | 9/1991 | Pantaleo et al. | 428/13 |
| 5,104,699 | 4/1992 | Pantaleo et al. | 428/13 |
| 5,256,457 | 10/1993 | Pantaleo et al. | 428/13 |

*Primary Examiner*—Henry F. Epstein
*Attorney, Agent, or Firm*—Wallenstein & Wagner, Ltd.

[57] ABSTRACT

A liquid-filled device including a pair of superimposed pliable sheets that are interconnected or sealed along peripheral edges. The superimposed pliable sheets are also interconnected along an inner seam. A first chamber for containing a liquid is defined by a space between peripheral edges of the sheets and the inner seam. The portion of the device which is between the superimposed pliable sheets and which is inboard of the inner seam defines a second chamber for containing a liquid. The device further includes an opening along a portion of the inner seam, which opening is sufficiently large to permit both liquid and discrete articles within that liquid to flow in both directions between the first and second chambers.

4 Claims, 2 Drawing Sheets

LIQUID-FILLED,TWO-CHAMBER DEVICE PERMITTING TRANSFER OF LIQUID AND DISCRETE ARTICLES BETWEEN THOSE CHAMBERS

BACKGROUND OF THE INVENTION

Protective serving devices, such as placemats and coasters, are used extensively for food and beverage product service in various public facilities and in residential kitchens. Restaurants that cater to families may provide amusement devices for the children of those families, and these amusement devices may be incorporated into the placemats that are used for serving the food. For example, restaurants have been known to provide disposable paper placements that embody various types of games to keep children occupied before, during and after meals.

These products must be reasonably priced and, thus, relatively inexpensive to manufacture. Examples of improved devices in this field are disclosed in U.S. Pat. No. 4,738,888 (hereinafter the "'888 patent"), which was issued to the assignee of the present invention on Apr. 19, 1988. The '888 patent discloses a reusable protective serving mat which includes an amusement device.

Specifically, the '888 patent discloses a serving mat, including a pair of superimposed pliable sheets sealed to each other to define a chamber. The chamber contains a free-flowing medium such as water. A plurality of discreet articles are suspended in the liquid medium and are movable by manipulation of the liquid in the chamber. Art upper sheet of the serving mat is transparent, so that the inner surface of a lower sheet of the serving mat and the contents of the chamber may be seen. The inner surface of the lower sheet of the serving mat carries fanciful indicia.

The '888 patent and all of the U.S. patents noted as being of record by the U.S. Patent Office during prosecution of the '888 patent are incorporated by reference into this specification. These references include U.S. Pat. Nos. Des. 175, 089, issued to Newmark; 2,703,087, issued to Newmark; 2,738,616, issued to Windle; 3,377,738, issued to Goodrum, Jr.; 3,898,781, issued to Facchini; 3,983,277, issued to Ackerman et al.; 4,359,224, issued to Nottingham et al.; 4,362,299, issued to Suzuki; 4,608,323, issued to Zaborney; and 4,631,210, issued to McGee et al.

Yet another example of a protective serving mat is disclosed in U.S. Pat. No. 5,047,267 (hereinafter the "'267 patent"), by an inventor of the present invention. The '267 patent discloses a protective serving mat which is comprised of generally flat first and second chambers superimposed on each other. The first chamber is transparent and is adopted to contain a fluid medium and objects suspended in that fluid medium. The first chamber includes a resealable opening so that a user may access the first chamber to alter the contents. The second chamber is visible through the first chamber, and is used to protect and display generally flat items. The second chamber includes an opening to allow access to the chamber so that the generally flat items can be varied, as desired by a user. Typical of the flat items which may be interchanged are menus or indicia bearing papers.

The '267 patent and all of the references of record therein are also incorporated into this specification by reference. These references, exclusive of those that have already been cited in connection with the '888 patent above, include U.S. Pat. Nos. 4,057,921, issued to Ball; 4,390,575, issued to Kopp; 4,528,224, issued to Ausnit; 4,561,109, issued to Herrington; 4,686,784, issued to Smithies; and 4,736,853, issued to O'Mara.

The '888 patent discloses a placemat having a small annular chamber 54. A liquid medium 56, such as colored water, is contained in that chamber. A plurality of discreet articles or objects are suspended in that liquid medium. These discreet articles or objects are movable by manipulation of the liquid within an annular channel defined by the chamber.

U.S. Pat. No. 5,104,699 (hereinafter the "'699 patent"), issued to Pantaleo et al. on Apr. 14, 1992, is relevant to the present invention. The '699 patent discloses a device with distinct similarities to the present invention, in that the article of the '699 patent also has a first and second 22 water-filled chamber. One embodiment of that patent, however, discloses that the chambers are separated. Another embodiment, disclosed at column 4 and claimed in claim 6, discloses that there may be openings between these first and second chambers. These openings 38 and 40 are small, however, as may be seen in FIG. 1. In addition, it is specifically disclosed that the openings in this second embodiment are intended to permit two-way movement of the liquid between the first and second chambers. There is no disclosure that the openings are large enough to permit movement of the discrete articles between the first and second chambers. Rather, the disclosure in the '699 patent provides that "openings 38 and 40 . . . may be provided to enable fluid communication between chamber 22 and channel 28. In this way, as the liquid 30 within the channel is manipulated, and as this liquid 30 in turn propels the movable object around that channel, some of the liquid 30 may enter chamber 22 . . . " (emphasis added). Nothing in the disclosure teaches or suggests that the discrete articles in one chamber are sufficiently small to flow with the liquid in one chamber and pass into the other chamber.

Another patent disclosing water-filled serving mats is U.S. Pat. No. 5,256,457, issued to Pantaleo et al. on Oct. 26, 1993.

SUMMARY OF THE INVENTION

The invention is a liquid-filled device which includes a pair of superimposed pliable sheets that are interconnected or sealed along peripheral edges. The superimposed pliable sheets are also interconnected along an inner seam. In this way, a first chamber for containing a liquid is defined by a space between the interconnection along peripheral edges of the sheets and the inner seam. The portion of the device which is between the superimposed pliable sheets and which is inboard of the inner seam defines a second chamber for containing a liquid. The device further includes an opening along a portion of the inner seam. This opening is sufficiently large to permit both liquid and discrete articles between that liquid to flow in both directions between the first and second chambers.

As but one example, the liquid-filled article of manufacture of the invention may include an opening along the inner seam of about 1⅜ inches. In such a device, the inner seam separating the first and second chambers has a circumference or length of approximately 32 inches.

DETAILED DESCRIPTION OF THE PREFERRED EMBODIMENT

It has now been found that by providing an opening of sufficient length in a seam which separates a first water-filled chamber from a second water-filled chamber, both a liquid and discrete articles suspended in that liquid can move freely in both directions between those two chambers. This discovery suggests many possibilities for unique themes and concepts for water-filled placemats or toys.

Figure 1:
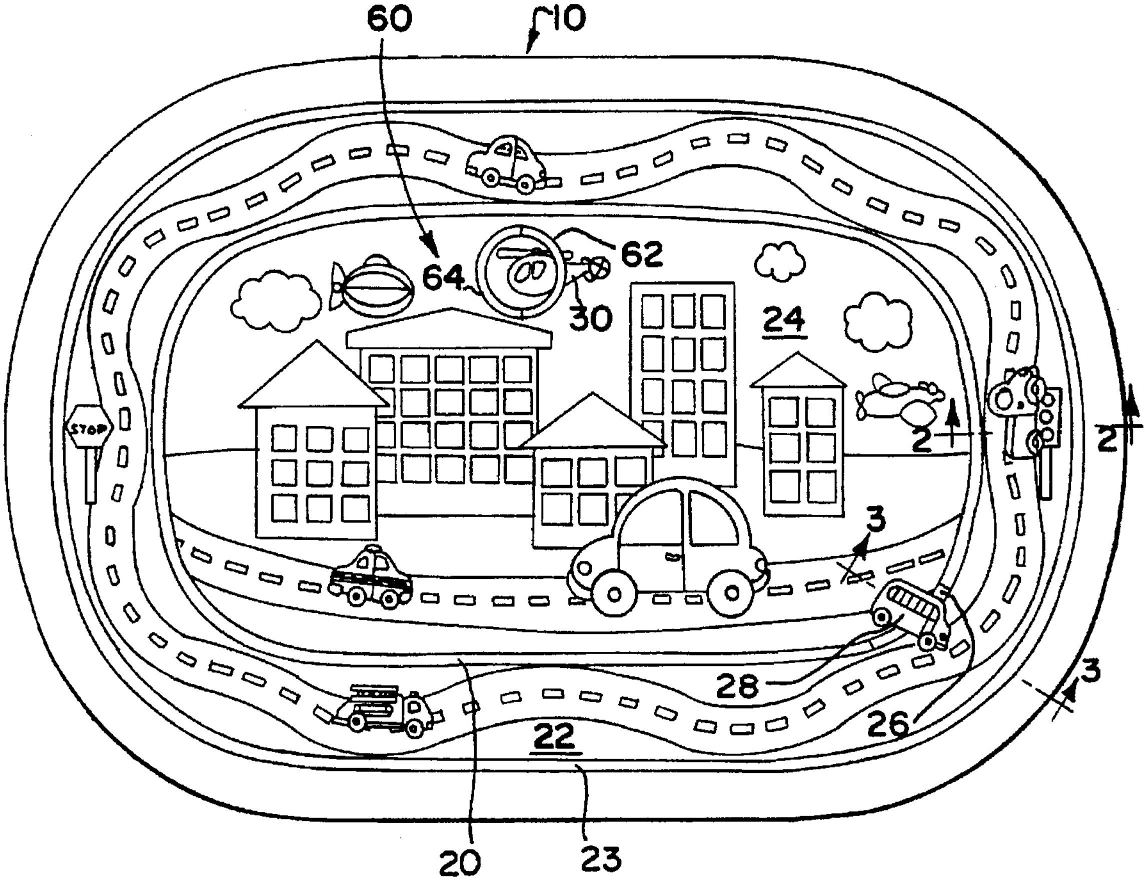
FIG. 1 is a plan view of a placemat in accordance with the preferred embodiment of the present invention.
Figure 4:
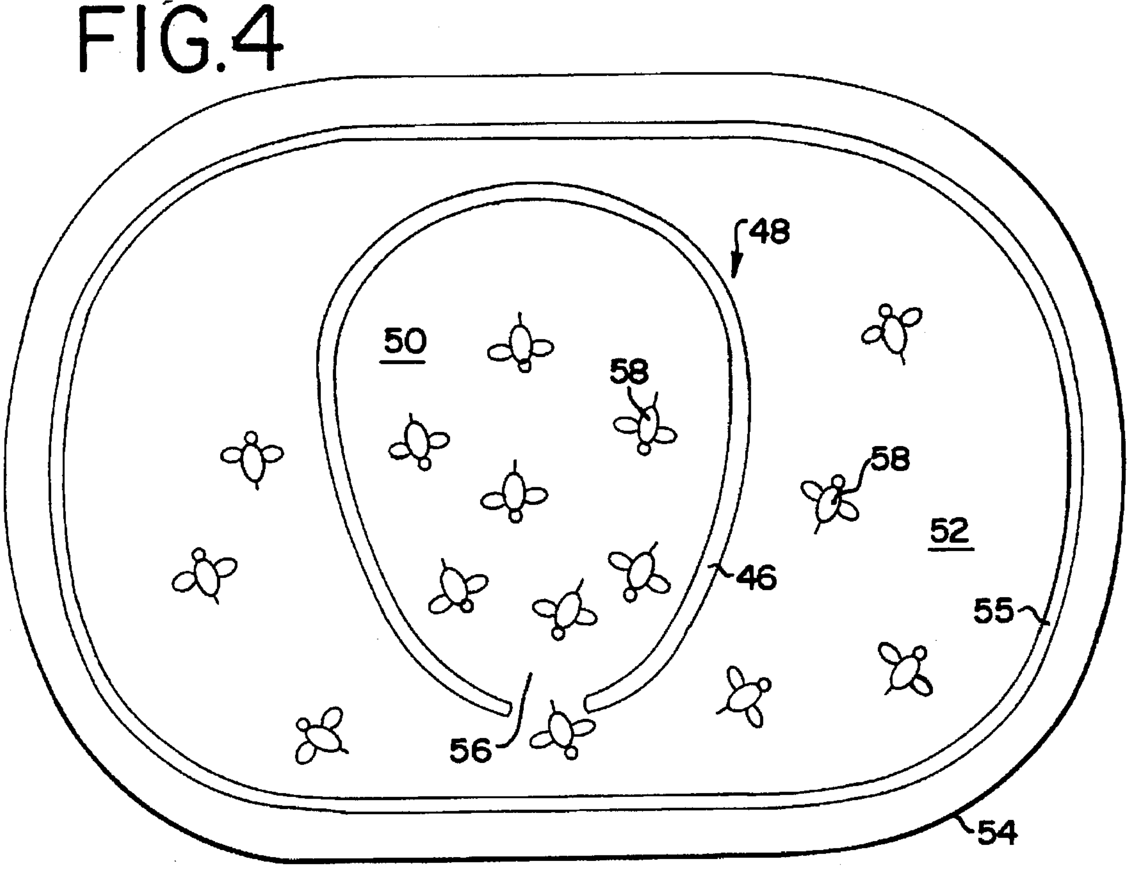
FIG. 4 is a plan view of a second placemat having the features of the present invention.
Figure 5:
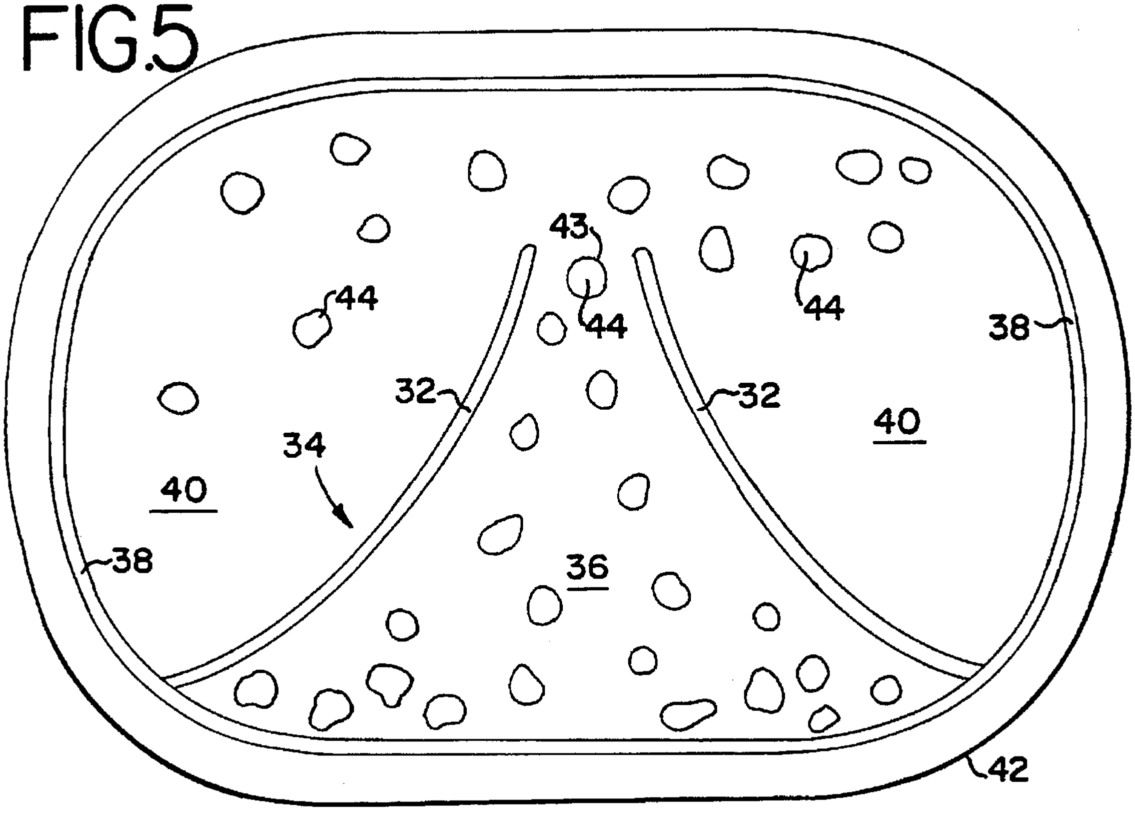
FIG. 5 is a plan view of a third placemat having the features of the present invention.

Three different themes, as provided in devices in accordance with the invention, are shown in FIGS. 1, 4 and 5, respectively.

Figure 2:
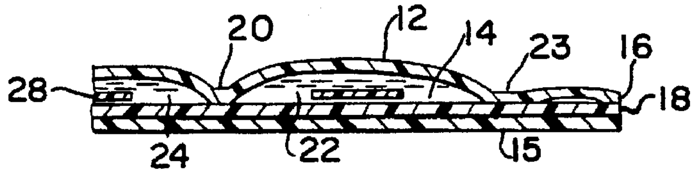
FIG. 2 is a sectional view of a portion of FIG. 1 taken along lines 2—2 of FIG. 1.
Figure 3:
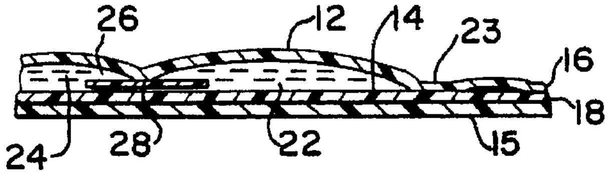
FIG. 3 is a sectional view of a portion of FIG. 1 taken along lines 3—3 of FIG. 1.

Turning to FIGS. 1–3 of the drawings, the preferred embodiment of the invention comprises a placemat 10 that is generally oval-shaped. The placemat 10 consists of two superimposed, pliable plastic sheets 12 and 14. Optionally, a third stiff backing sheet 15 may be provided. Preferably, sheets 12 and 14 are made of a heat-sealable plastic material, such as polypropylene. The first sheet is preferably transparent, for reasons to be described later.

As may be seen in FIG. 2, this pair of superimposed pliable sheets 12 and 14 have peripheral edges 16 and 18, and these edges may be permanently joined by heat-sealing. The superimposed pliable sheets 12 and 14 are also interconnected along a heat-sealed inner seam 20. In this way, a first chamber 22 for containing a liquid is defined by a space between the interconnection along peripheral edges 16 and 18 of the sheets 12 and 14 and the inner seam 20. In the embodiment of FIG. 1, an intermediate seam 23 is provided, and the first chamber 22 is actually formed between the intermediate seam 23 and the inner seam 20.

A second chamber 24 for containing a liquid is defined by that portion of the device which is both (1) between the superimposed pliable sheets 12 and 14; and (2) inboard of the inner seam 20.

As may be seen from FIGS. 1 and 3, an opening 26 is provided along a portion of the inner seam 20. This opening 26 is sufficiently large to permit the two-way movement of both the liquid and discrete articles. Two-way movement of the liquid and discrete articles is intended to mean their passage from the first chamber 22 through the opening 26 to the second chamber 24, and then from the second chamber 24 through the opening 26 and into the first chamber 22 again.

In the embodiment of FIG. 1, the device is oval in shape with a height of about 11 inches and a length of about 16½ inches. The inner seam 20 is positioned about 2 inches from the outer periphery of the placemat, and this inner seam 20 has a total length or circumference of about 32 inches. Intermediate seam 23 is positioned about ¾ inches from the outer periphery of the placemat, and has a circumference of about 38 inches. For this size placemat, it has been found that an ideal size for the opening 26 along a portion of the inner seam 20 is approximately 1⅜ inches in length. It is believed that the single opening 26 in the seam 20 should be between –7% of the length or circumference of that seam 20.

The effects of the novel claimed structure can be seen by a review of FIGS. 1, 4 and 5. In FIG. 1, the placemat depicts a first chamber 22 that is shaped like, and has the appearance of, a racetrack. Discrete articles that are made of a thin, pliable plastic float within and move with the liquid within the first chamber 22 and second chamber 24. Such discrete articles can be in the form of vehicles. As may be seen in FIGS. 1 and 3, these discrete articles may take the form of vehicles, such as the school bus 28, which generally move from the second chamber 24 into this first chamber 22/racetrack.

The second chamber 24 inboard of the inner seam 20 depicts a cityscape. Aircraft, such as the helicopter 30, can be moved along this cityscape by manipulating the water within the second chamber 24.

The opening 26 along a portion of the inner seam 20, however, permits the discrete articles, including vehicles such as the school bus 28 and aircraft such as the helicopter 30, to move freely from the first chamber 22 to the second chamber 24, and then back again.

When a child plays with the placemat 10 in a customary manner, that play results in a tendency of the discrete articles, such as the school bus 28 and the helicopter 30, to be "whisked" from the first chamber 22 into the second chamber 24. Particularly, when one pushes with the hand on the top of second chamber 24, the second chamber 24 is flattened and compressed, causing a decrease in its effective volume. The resulting pressure and decrease in volume causes water to flow out from that second chamber 24 and into first chamber 22 through opening 26.

When the child's hand is removed from the top of the second chamber 24, the pressure on that chamber 24 is released, and water from the first chamber 22 forcefully surges back into the second chamber 24. This surge of water carries discrete articles, such as the school bus 28 and helicopter 30, into the second chamber FIG. 4 shows a second embodiment. In this embodiment, the inner seam 46 defines the exterior shape of a beehive 48. The second chamber 50 of this embodiment is the portion of the placemat inboard of the inner seam 46. The first chamber 52 is between the periphery 54 of the placemat and the inner seam 46. More particularly, the first chamber 52 of this embodiment is defined by the portion of the placemat between an intermediate seam 55 and the inner seam 46. Liquid and discrete articles pass in both directions between the first chamber 52 and the second chamber 50 through the opening 56, which is positioned as the lower "entrance" of the beehive 48. The discrete articles 58 in this embodiment have the color and shape of bees. These bees 58 appear to move rapidly into the beehive 48 when pressure on the second chamber 50 is released.

FIG. 5 shows a third embodiment. The inner seam 32 of this embodiment defines the exterior shape of a volcano 34. The second chamber 36 of this embodiment is the "volcano" portion of the placemat, i.e., that inboard of the inner seam 32. The first chamber 40 is defined by the portion of the placemat between an intermediate seam 38 of the placemat and the inner seam 32. The placemat includes an outer periphery 42. Liquid and discrete articles pass in both directions between the first chamber 40 and the second chamber 36 through the opening 43, which is positioned as the open "top" of the volcano 34. The discrete articles 44 in this embodiment have the color and shape of fiery lava and ash particles.

Another aspect of this invention is shown in the embodiment of FIG. 1. A loop 60 is shown in this embodiment. A first portion 62 of the loop 60 appears on the upper pliable sheet 12. The second portion 64 of the loop 60 appears on the lower pliable sheet 14. In this way, there is an illusion that helicopter 30 moves through the loop 60. Particularly, this illusion results from the fact that the helicopter 30 is positioned above the second portion 64 of the loop 60, but below the first portion 62 of the loop 60. As a result, as the helicopter 30 "passes through" the loop 60, a three-dimensional effect occurs.

It shall be understood that for the purposes of this invention and its claims, a "loop" shall be defined as being of any shape, i.e., round, square, polygonal, oval or irregular.

It will also be understood that the term "loop" shall very broadly include other graphic devices, such as tunnel graphics or cloud graphics. As with the loop, one part of the tunnel or cloud would be on the upper pliable sheet 12, and the other part of the tunnel or cloud would be on the lower pliable sheet 14. In this way, the airplane or train would appear to move, in a three-dimensional sense, through the cloud or tunnel, respectively.

What I claim is:

1. A liquid-filled article of manufacture, comprising:

a. a pair of superimposed pliable sheets, said sheets having peripheral edges;

b. said superimposed pliable sheets being further interconnected along an inner seam, whereby a first chamber for containing a liquid is defined by a space between:

(1) the peripheral edges of said sheets and (2) said inner seam;

c. the portion between said superimposed pliable sheets which is inboard of said inner seam defining a second chamber for containing a liquid; and d. an opening along a portion of said inner seam, said opening being sufficiently large to permit liquid to flow in both directions between said first chamber and said second chamber, and to permit a plurality of discrete articles within said first and second chambers to be transferable in both directions between said first chamber and said second chamber.

2. The liquid-filled article of manufacture of claim 1, wherein said opening along a portion of said inner seam has a length of no more than 5% of the circumference of said inner seam.

3. The liquid-filled article of manufacture of claim 1, wherein said opening along a portion of said inner seam has a length of between 4–7% of the circumference of said inner seam.

4. A liquid-filled article of manufacture, said article comprising:

a. an upper pliable sheet and a lower pliable sheet, said pliable sheets being superimposed, and said sheets being interconnected;

b. liquid contained between said superimposed sheets, and discrete articles within said liquid;

c. a loop which results in a three-dimensional effect as said discrete articles move through said loop, said loop being formed upon said superimposed sheets, said loop comprising a first portion upon said upper pliable sheet and a second portion on said lower pliable sheet.

* * * * *

UNITED STATES PATENT AND TRADEMARK OFFICE

CERTIFICATE OF CORRECTION

PATENT NO. : 5,656,341

DATED : August 12, 1997

INVENTOR(S) : TERESE A. PANTALEO

It is certified that error appears in the above-indentified patent and that said Letters Patent is hereby corrected as shown below:

Column 1, Line 1, the Technical Field was omitted. Please insert the following as the Technical Field: --The invention is directed to a liquid-filled device, typically made of a pair of superimposed, pliable polymeric sheets sealed to each other to define two liquid-filled chambers. An opening in a seam which otherwise separates those chambers permits both liquid and discrete objects suspended in that liquid to flow in both directions between the first and second chambers.--

Column 1, Line 29, "Art" should be -- An--.

Column 3, Line 63, "-7%" should be --4-7%--.

Signed and Sealed this

Twenty-fourth Day of February, 1998

*Attest:*

BRUCE LEHMAN

*Attesting Officer* *Commissioner of Patents and Trademarks*